United States Patent Office 2,856,507
Patented Oct. 14, 1958

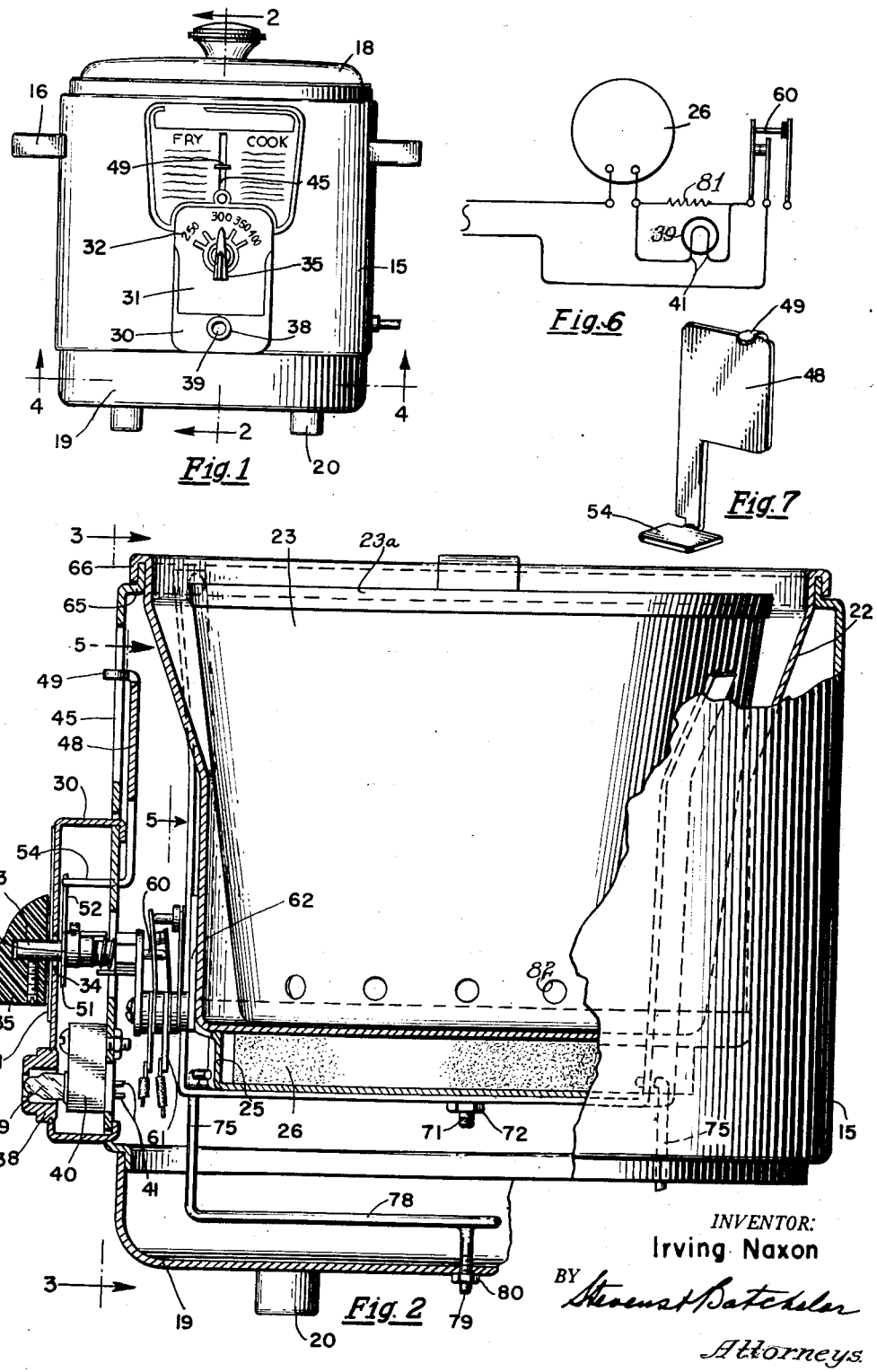

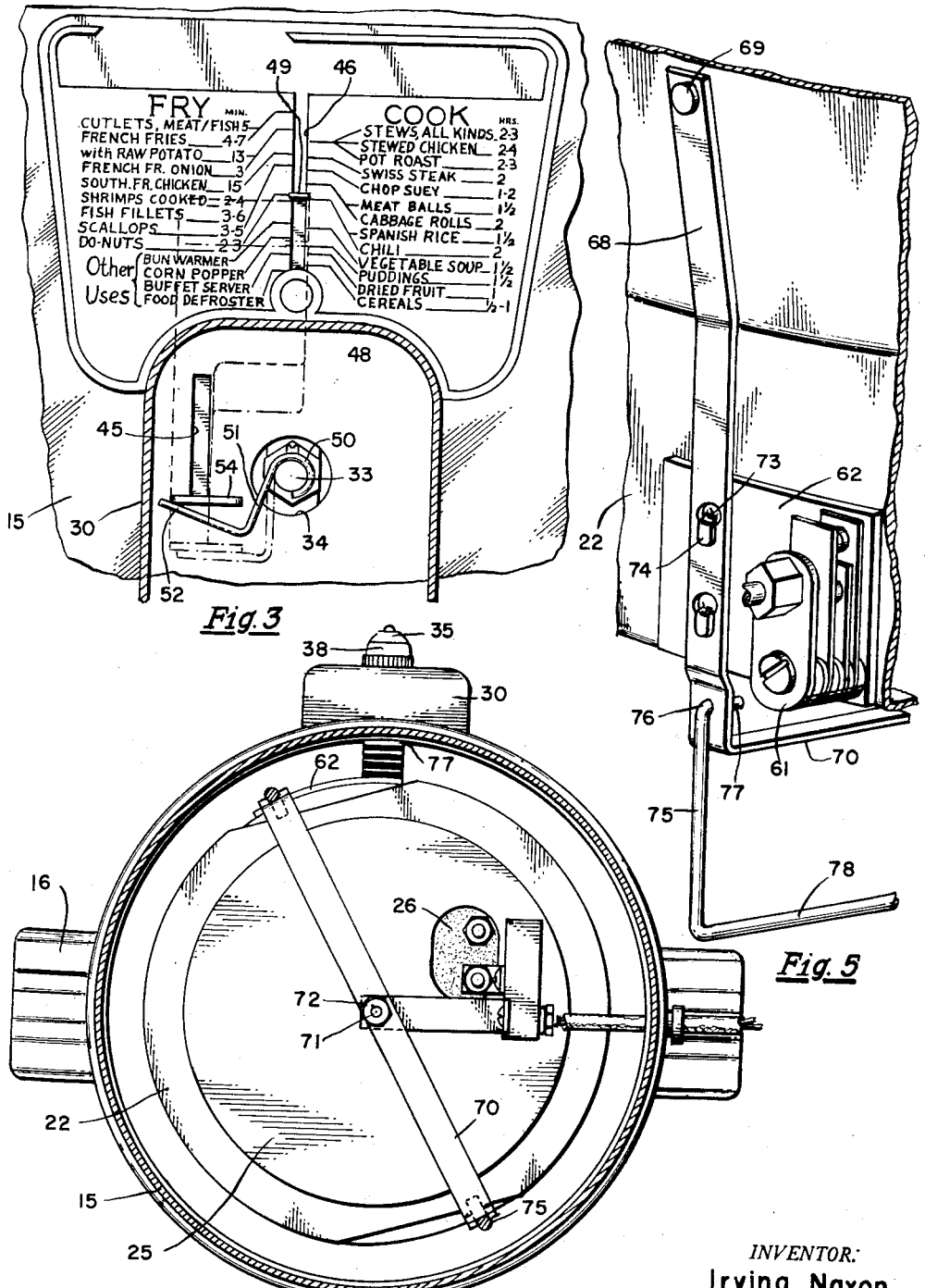

2,856,507
COOKING AND FRYING INDICATORS

Irving Naxon, Chicago, Ill.

Application May 14, 1954, Serial No. 429,800

1 Claim. (Cl. 219—44)

My invention relates to electric cooking appliances, and more particularly to such appliances as are used primarily for deep fat frying. In appliances of this type, it is important to cook each food for a period usually prescribed for it; and such period ordinarily is determined by reference to a cookbook or chart furnished with the appliance. The latter has a variable control indicating progressive cooking temperatures, the control being coupled with a thermostatic device designed to maintain any temperature to which the control is set. The time during which different foods are cooked is listed on the chart, usually in terms of minutes, and the control is turned off by the user when the proper cooking time for the food has ended.

In using the conventional cooking appliance having the above characteristics, it is necessary for the user to consult the cookbook or chart for the temperature at which a given food must be cooked before the control of the appliance can be set to put the same in operation. At times, a cookbook with the proper chart is not readily available, or the chart is not carried by the appliance, so that a delay, uncertainity, or even anxiety may be involved when the cooking of a given food is contemplated. Thus, should a food be cooked for an improper period, it may be undercooked or burned, defeating the purpose of the appliance.

In view of the above conditions, it is one object of the present invention not only to provide a detailed food chart bearing cooking periods and situated prominently over the control of the appliance, but also to provide an indicator which cooperates with the listing of the foods to set the temperature control.

A further object is to provide an indicator adjacent to the list of foods and movable relative to each item in the list, such indicator being connected to the control in a manner to set the latter at the temperature required for each food.

An additional object is to provide an indicator of the above character which is moved by the manual operation of the temperature control and in a direction corresponding to the progress thereof, the indicator being positioned along a scale of food listings which progresses in accordance with the temperatures at which the foods are to be cooked.

Another object is to provide an indicator of the above character which simulates a thermometer column set adjacent to the listings of foods referred to, the progressive direction of the column being upward as the rise of temperature in a thermometer in keeping with a scale of progressive temperatures at which the list of foods is designed to be cooked.

A still further object is to accomplish the above functions by means of a simple mechanism whose cost adds but little to that of the appliance.

With the above objects in view, a better understanding of the invention may be had by reference to the accompanying drawings, in which—

Fig. 1 is a front elevation of the improved appliance;

Fig. 2 is an enlarged fragmental section on the line 2—2 of Fig. 1;

Fig. 3 is a fragmental section on the line 3—3 of Fig. 2;

Fig. 4 is an enlarged section on the line 4—4 of Fig. 1;

Fig. 5 is a perspective view of an internal arrangement viewed substantially from the arrows 5—5 of Fig. 2;

Fig. 6 is a diagrammatic view of an electrical circuit involving the control indicator; and Fig. 7 is a perspective view of the indicator.

In accordance with the foregoing, specific reference to the drawings indicates the casing of the cooking appliance at 15, the same being cylindrical and formed with non-heat conducting handles 16. The casing receives a cover 18 at the top and a bottom pan 19, the latter having non-heating conducting feet 20.

The casing 15 is fitted on the inside with a deep vessel 22 in which foods to be cooked are deposited. However, when the appliance is used for deep frying, the vessel 22 receives a filling of fat and the usual basket 23 in which the food to be fried is contained. The vessel 22 is fitted underneath with a housing 25 in which a suitable electrical heating unit 26 is contained and in direct contact with the bottom of the vessel 22.

The front wall of the casing 15 is fitted with a compartment 30 whose frontal face carries a chart 31 on which progressive temperature readings are marked in the form of an arcuate scale 32. The compartment 30 contains the shaft 33 of the temperature control, such shaft projecting forwardly through an opening 34 in the front wall of the compartment to receive a pointer knob 35. This knob may be manipulated to rotate the shaft 33 to points in the scale 32. The front wall of the compartment 30 also receives a window fitting 38 for an electric light bulb 39 designed to be illuminated when the cooking appliance is in operation. The base for this bulb is indicated at 40 and is secured to the front wall of the casing 15, the incidental electrical conductors 41 for the light bulb 39 extending inwardly of the casing wall for connection, as indicated in Fig. 6.

Fig. 3 shows that the front wall of the casing 15 is made with a vertical slot 45 at the center above the compartment 30; and listing of foods to be fried and cooked are made on opposite sides of the slot. The foods are listed in upward progression in respect to the time they require to be fried or cooked, such as in terms of minutes or hours; and lines 46 are directed from the respective food entries to points alongside the slot 45. A plate 48 is situated and slidable vertically in back of the slot, the upper end of the plate having a lug 49 projecting forwardly through the slot. While the chart 31 is black in color, the plate 48 is bright red to contrast with the chart and simulate a thermometer column when the plate rises or falls.

It has been mentioned that the turning of the control knob 15 points to progressive temperatures in the scale 32; and the heating unit 26 under the vessel 22 is so connected electrically that it operates at temperatures to which the control knob 35 is set. However, a mechanical connection is also provided to place the height of the plate in positions corresponding to those of the knob 35. Thus, with the lines 46 properly calibrated in respect to the plate lug 49, the latter may be set at the line corresponding to the foods intended to be fried or cooked; and when such setting is made, the knob 35 will be set to indicate the temperature required for frying or cooking the chosen food.

The particular mechanism involved in the vertical movement of the indicator plate 48 is quite simple.

Thus, the shaft 33 is firmly engaged by a loop 50 forming one portion of a wire rod 51; and the other portion thereof is in the form of an outward bend 52 which is positioned directly below a bottom flange 54 bent forwardly from the lower end of the plate 48. The plate may be lifted or lowered to any position between those indicated by long and short dotted lines in Fig. 3 by simply turning the knob 35 accordingly.

The turning of the control knob 35 is designed to advance or retard a pin 60 operating in respect to a thermostatic switch device 61 which has a base plate 62. This device is a standard unit employed in cooking or frying appliances to control the temperature thereof by varying the heating intervals according to the settings of the control knob, and the device therefore will not be described in detail. However, a low-value resistor 81 is inserted between the heating unit 26 and the thermostat 61 to provide a low voltage for the pilot light 39.

The present appliance is also designed for simple assembly and dismantling. Thus, the wall of the casing 15 is offset inwardly at the top as shown at 65 to facilitate a supporting fit with a channeled rim 66 formed at the top of the vessel 22. The housing 25 of the heating unit 26 is held to the vessel by the application of a pair of straps 68 to the vessel 22 from opposite sides. As seen in Figs. 2 and 5, the straps are secured to the upper part of the vessel by rivets 69; and they combine in a bottom bar 70 which underlies the housing 25 and is perforated for the downward passage of a bolt 71 from the same, such bolt receiving a nut 72 to secure the bar 70 to the housing 25. One of the straps 68 is perforated at two vertically spaced points, as shown at 73, for the passage of clips 74 from the base plate 62 of the thermostatic device 61 in order to support such base plate from the strap assembly. The straps 68 also form a support for a wire rod 75 by being perforated at 76 to receive inward top bends 77 from such rod. The rod 75 has a bottom cross bar section 78 from the center of which a bolt 79 projects downwardly through a perforation in the bottom pan 19 to receive a securing nut 80, so that the bottom pan becomes attached to the casing 15 in this manner.

It will be noted that the rim of the basket is provided with a bead 23a and further that there is a large annular space between the upper portion of the basket and that of the fat-containing vessel. It also should be noted that the basket is not made of the conventional wire mesh but of sheet metal with holes 82 in its lower portion only. Thus, the basket is in itself a closure above the level of the holes, rather than fully perforated as in the case of a wire basket. Where an overflow in a wire basket would spread sidewise from the same, fill the vessel 66 and run over the top thereof, in the instant cast the overflow from the basket would run into the space between its rim and the wall of the vessel and run down along the inside of the vessel to assume a normal level. Also, since the vesesl is of relatively thin sheet metal, and the heating element therefor is located only at the bottom thereof, it is logical that the upper portion of the vessel 22 is relatively cool, especially since it terminates into good thermoconductive relation to the normally cool outer casing 15. Thus, the overflow striking the cooler vessel outside the basket condenses rapidly, and does not reenter the basket until it reaches the perforations in the lower part thereof.

It will now be apparent that the novel control not only indicates the degrees of heat adjustment as the control knob 35 is turned to operate the thermostatic device, but that it also provides a direct guide for setting the knob according to the food desired to be cooked. In other words, the person operating the appliance need have no concern whatever about the degrees of heat prescribed for cooking or frying various foods, but need only set the indicator column to a chosen food marking or line in order to have the control set at the temperature prescribed for such food. The setting of the appliance is therefore exceedingly simple and self-contained, since no outside cookbook or guide need be consulted. Further, the columnar indicator is at once simulative of a thermometer column and therefore suggestive of heat degrees, so that settings or variations of the column are a telltale of heat values when associated with the food markings in front of the appliance. Besides, the thermometer simulation is a fascinating surprise and novelty for the type of appliance under consideration.

I claim:

In a cooking appliance having an outer casing, an inner cooking well with a heating unit, a rotary manual control movable for operating the appliance at different degrees of heat for different kinds of food, a frontal chart carried by said casing and bearing a vertical list of foods in the upward order of progressive heat degrees required for the different foods listed, a visual indicator movable vertically along said list in accordance with the movements of the manual control to simulate the action of a thermometer column in reference to the foods, a cam rotatable by said manual control and adapted to move said visual indicator upwardly and downwardly along said list to simulate the rise and fall of fluid in a thermometer in response to the rotation of the cam in one or the other direction, said casing having a vertical slot adapted to receive said visual indicator slidably, and a pointer portion of the latter passing forwardly through said slot while another portion of the indicator extends within the casing and is visible through the slot.

References Cited in the file of this patent

UNITED STATES PATENTS

| | | |
|---|---|---|
| 1,870,769 | Del Sonno | Aug. 9, 1932 |
| 1,994,268 | Bartels | Mar. 12, 1935 |
| 1,994,909 | Ehrgott | Mar. 19, 1935 |
| 2,034,500 | Zeh | Mar. 17, 1936 |
| 2,078,637 | Naden | Apr. 27, 1937 |
| 2,187,888 | Nacumsohn | Jan. 23, 1940 |
| 2,194,117 | Graham | Mar. 19, 1940 |
| 2,195,958 | Kearsley | Apr. 2, 1940 |
| 2,452,657 | Hooper | Nov. 2, 1948 |
| 2,529,832 | Brietzke | Nov. 14, 1950 |
| 2,538,188 | Brietzke | Jan. 16, 1951 |
| 2,630,515 | McCormick et al. | Mar. 3, 1953 |
| 2,678,509 | Hansen | May 18, 1954 |
| 2,695,947 | Heerdt | Nov. 30, 1954 |
| 2,725,029 | Ammerman | Nov. 29, 1955 |
| 2,753,436 | Schwaneke | July 3, 1956 |
| 2,782,403 | Pearce | Feb. 19, 1957 |